US008853299B2

(12) United States Patent
SenGupta et al.

(10) Patent No.: US 8,853,299 B2
(45) Date of Patent: *Oct. 7, 2014

(54) LIGNITE-BASED URETHANE RESINS WITH ENHANCED SUSPENSION PROPERTIES AND FOUNDRY SAND BINDER PERFORMANCE

(75) Inventors: Ashoke K. SenGupta, Strongsville, OH (US); Vincent J. Losacco, St. Charles, IL (US); Jerald W. Darlington, Jr., Marengo, IL (US)

(73) Assignee: Amcol International Corp., Hoffman Estates, IL (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/574,475

(22) Filed: Oct. 6, 2009

(65) Prior Publication Data
US 2011/0082233 A1 Apr. 7, 2011

(51) Int. Cl.
| | | |
|---|---|---|
| B22C 1/22 | (2006.01) | |
| C08G 18/63 | (2006.01) | |
| C08H 7/00 | (2011.01) | |
| C08L 97/00 | (2006.01) | |
| C08L 99/00 | (2006.01) | |
| C08G 18/08 | (2006.01) | |
| C08L 75/00 | (2006.01) | |
| C08G 18/67 | (2006.01) | |
| C08L 71/02 | (2006.01) | |
| C09D 7/00 | (2006.01) | |
| C09D 7/02 | (2006.01) | |
| C08G 18/64 | (2006.01) | |

(52) U.S. Cl.
CPC ............. *C08G 18/0876* (2013.01); *C08L 71/02* (2013.01); *C09D 7/002* (2013.01); *C09D 7/02* (2013.01); *C08G 18/6492* (2013.01); *C08L 97/002* (2013.01)
USPC ........... 523/142; 524/700; 524/735; 524/871; 524/872; 524/873; 52/309.1; 52/309.13; 52/309.17

(58) Field of Classification Search
USPC ......... 524/735, 871, 872, 700, 873; 52/309.1, 52/309.13, 309.17; 523/142
See application file for complete search history.

(56) References Cited

U.S. PATENT DOCUMENTS

| | | | |
|---|---|---|---|
| 3,023,113 A | 2/1962 | Barlow | |
| 3,083,118 A | 3/1963 | Bridgeford | |
| 3,445,251 A | 4/1966 | Nevins | |
| 3,330,686 A | 7/1967 | Rose | |
| 3,409,579 A | 11/1968 | Robins | |
| 3,429,848 A | 2/1969 | Robins | |
| 3,432,457 A | 3/1969 | Robins | |
| 3,535,359 A * | 10/1970 | Rockstroh et al. ............ 560/331 |
| 3,645,937 A | 2/1972 | Lang et al. | |
| 3,676,392 A | 7/1972 | Robins | |
| 3,743,621 A | 7/1973 | Molotsky | |
| 3,832,191 A * | 8/1974 | Bolding et al. .............. 106/38.3 |
| 3,862,080 A | 1/1975 | Standen et al. | |
| 3,925,296 A | 12/1975 | Stone et al. | |
| 3,947,392 A | 3/1976 | Lang et al. | |
| 4,247,432 A | 1/1981 | Huang et al. | |
| 4,311,631 A * | 1/1982 | Myers et al. ................. 523/143 |
| 4,359,339 A | 11/1982 | Van Fisk, Jr. | |
| 4,400,475 A | 8/1983 | Kennedy | |
| 4,417,998 A | 11/1983 | Kennedy | |
| 4,452,905 A | 6/1984 | Drinkuth et al. | |
| 4,532,260 A | 7/1985 | MacKeighen et al. | |
| 4,586,936 A | 5/1986 | Schaffer et al. | |
| 4,595,646 A | 6/1986 | Tsubuko et al. | |
| 4,597,878 A | 7/1986 | House et al. | |
| 4,608,397 A | 8/1986 | Reischl | |
| 4,705,570 A | 11/1987 | Paul et al. | |
| 4,734,439 A | 3/1988 | Reischl | |
| 4,735,973 A | 4/1988 | Brander | |
| 4,801,621 A | 1/1989 | Reischl | |
| 4,851,457 A | 7/1989 | Kurple | |
| 4,855,052 A | 8/1989 | Reischl | |
| 5,244,473 A | 9/1993 | Sardessai et al. | |
| 5,320,157 A | 6/1994 | Siak et al. | |
| 5,376,696 A | 12/1994 | Dunnavant et al. | |
| 5,430,072 A | 7/1995 | Muller et al. | |
| 5,455,287 A | 10/1995 | Carpenter et al. | |

(Continued)

FOREIGN PATENT DOCUMENTS

| | | |
|---|---|---|
| CA | 0 843 443 | 6/1970 |
| EP | 0 361 447 A2 | 4/1990 |

(Continued)

OTHER PUBLICATIONS

Visser et al. (Science Direct Abstract: Geoderma vol. 42 No. 3-4 pp. 331-337 Aug. 1988).*

(Continued)

*Primary Examiner* — Patrick Ryan
*Assistant Examiner* — Aaron Greso
(74) *Attorney, Agent, or Firm* — Marshall, Gerstein & Borun LLP

(57) ABSTRACT

Described herein, in the preferred embodiment, is a leonardite-based polyurethane resin binder that may be used, among other applications, as a binder in combination with foundry aggregate, e.g., sand, for molding or casting metal parts. The binders described herein comprise a humic substance, preferably leonardite, combined with a polymerizable polyol, an isocyanate, and a polymerization catalyst to make a polyurethane resin binder in situ in a foundry aggregate, such as sand. The lignite is mixed with the polymerizable polyol, thickening and dispersing agents as additives to improve the suspension quality and binder performance of the lignite-containing part of the binder components.

10 Claims, 3 Drawing Sheets

(56) References Cited

U.S. PATENT DOCUMENTS

| | | | |
|---|---|---|---|
| 5,585,428 A | 12/1996 | Quinn et al. | |
| 5,611,853 A | 3/1997 | Morimoto | |
| 5,616,628 A | 4/1997 | Von Bonin et al. | |
| 5,688,313 A | 11/1997 | Landis | |
| 5,695,554 A | 12/1997 | Landis | |
| 5,769,933 A | 6/1998 | Landis | |
| 5,810,918 A * | 9/1998 | Landis | 106/38.22 |
| 5,856,375 A | 1/1999 | Chang et al. | |
| 5,859,091 A | 1/1999 | Chen et al. | |
| 5,911,269 A | 6/1999 | Brander et al. | |
| 5,916,826 A | 6/1999 | White | |
| 6,005,021 A | 12/1999 | Chen et al. | |
| 6,136,888 A | 10/2000 | Torbus et al. | |
| 6,264,775 B1 | 7/2001 | Holeschovsky et al. | |
| 6,288,139 B1 * | 9/2001 | Skoglund | 523/143 |
| 6,291,550 B1 | 9/2001 | Chen et al. | |
| 6,506,223 B2 | 1/2003 | White | |
| 6,506,817 B1 | 1/2003 | Buchler | |
| 6,509,392 B1 * | 1/2003 | Jhaveri et al. | 523/142 |
| 6,554,049 B2 | 4/2003 | Steele et al. | |
| 6,559,203 B2 | 5/2003 | Hutchings et al. | |
| 6,719,835 B2 | 4/2004 | Brown | |
| 6,772,820 B2 | 8/2004 | Roze et al. | |
| 6,822,042 B2 | 11/2004 | Capps | |
| 6,834,706 B2 | 12/2004 | Steele et al. | |
| 6,846,849 B2 | 1/2005 | Capps | |
| 6,972,302 B2 | 12/2005 | Baker et al. | |
| 7,871,972 B2 | 1/2011 | SenGupta | |
| 8,309,620 B2 | 11/2012 | Fuqua | |
| 8,426,494 B2 | 4/2013 | Fuqua et al. | |
| 8,436,073 B2 | 5/2013 | Di et al. | |
| 2004/0039235 A1 * | 2/2004 | Bergstrom et al. | 568/595 |
| 2005/0017394 A1 | 1/2005 | Hochsmann et al. | |
| 2007/0281876 A1 * | 12/2007 | Garner et al. | 510/245 |
| 2008/0277351 A1 | 11/2008 | Harman et al. | |
| 2009/0162408 A1 | 6/2009 | SenGupta | |
| 2009/0314461 A1 | 12/2009 | Attridge et al. | |
| 2010/0319874 A1 | 12/2010 | Thiel et al. | |
| 2011/0019044 A1 | 1/2011 | Wang et al. | |
| 2011/0079366 A1 * | 4/2011 | Fuqua et al. | 164/527 |
| 2011/0081270 A1 * | 4/2011 | Fuqua | 420/8 |
| 2011/0082233 A1 | 4/2011 | SenGupta et al. | |
| 2011/0277952 A1 | 11/2011 | Di et al. | |

FOREIGN PATENT DOCUMENTS

| | | |
|---|---|---|
| JP | 58093791 | 6/1983 |
| WO | WO-02/28937 A2 | 4/2002 |
| WO | WO-2009/065015 A1 | 5/2009 |
| WO | WO-2009/065018 A1 | 5/2009 |
| WO | WO-2009/126960 A2 | 10/2009 |
| WO | WO-2009/155242 A1 | 12/2009 |
| WO | WO-2011/044003 A2 | 4/2011 |
| WO | WO-2011/044004 A2 | 4/2011 |
| WO | WO-2011/044005 A1 | 4/2011 |

OTHER PUBLICATIONS

What's in Products Data Base (Consumer Product Information Database p. 167 cir. 2001; PEG stearates) { http://whatsinproducts.com/search_database_result.php}.*

International Preliminary Report on Patentability, International application No. PCT/US2010/046077, mailing date Nov. 7, 2013.

International Search Report and Written Opinion, International application no. PCT/US2012/046077, mailing date Oct. 10, 2012.

Greene et al., Protective Groups in Organic Synthesis, John Wily & Sons (1999).

Jhurry et al., "Sucrose-Based Polymers: Polyurethanes with Sucrose in the Main Chain," *Eur. Polym. J.*, 33:1577-1582 (1997).

International Search Report and Written Opinion for Application No. PCT/US2010/051254, dated Feb. 16, 2011.

International Search Report and Written Opinion for Application No. PCT/US2010/051251, dated Oct. 7, 2011.

International Search Report and Written Opinion for Application No. PCT/US2010/051253, dated Oct. 7, 2011.

International Preliminary Report on Patentability for Application No. PCT/US2010/051254, dated Aug. 2, 2011.

Monroe, Use of iron oxide in mold and core mixes for ferrous castings, AFS Transactions, 93: 355-364 (1985).

International search report and written opinion for International Application No. PCT/US12/33861, mailing date Jul. 17, 2012.

* cited by examiner

LIGNITE-BASED URETHANE RESINS WITH ENHANCED SUSPENSION PROPERTIES AND FOUNDRY SAND BINDER PERFORMANCE

CROSS-REFERENCE TO RELATED APPLICATIONS

This application is related to and filed concurrent with copending U.S. patent application Ser. Nos. 12/574,501, 12/574,525 and 12/574,546.

TECHNICAL FIELD

This invention relates to polymerizable resin binders, particularly useful as foundry binders, processes for making foundry shapes by curing the binders in place after forming a foundry mold or core, foundry mixes and multi-part resin binder components or kits that are mixed on site to bind foundry aggregate, such as sand, in a desired shape.

BACKGROUND AND PRIOR ART

In the foundry art, sand casting is used to make metal parts. In sand casting, foundry shapes called molds, exterior casting forms, and cores, interior casting forms, are made from a mixture of a foundry aggregate, such as sand, and a binder. The two categories of sand molds are "green" and "rigid." Green sand molds are bonded with clay and water. Rigid sand molds are bonded with organic resins and can be hardened using one of several methods, including baking, curing with a chemical reagent, and flushing with a reactive gas. Molten metal is poured into and around the foundry shapes after they have hardened. The binders, e.g., phenol formaldehyde resins, or phenol-isocyanate (polyurethane) resins, used to form foundry shapes typically contain a significant amount of organic solvent, which can emit noxious fumes, as well as free reactants, e.g., formaldehyde or isocyanate and free phenol, that are detrimental to the cast metal and the foundry environment.

A urethane binder resin, when used in combination with a foundry aggregate such as sand, typically has three parts: a polymerizable polyol component, an isocyanate component, and a catalyst component. The polymerizable polyol compound, e.g., a polyol, such as ethylene glycol, and isocyanate react to form a cross-linked polymer which increases the tensile strength and/or hardness of the sand/binder mixture. The catalyst prompts the polymerizable components of the binder to polymerize, allowing for rapid conversion of the foundry mix into a hard and solid cured state suitable for forming shapes from molten metal poured therein.

Humic substances containing a plurality of hydroxyl groups have been asserted to represent an alternative reactant to the conventional phenol reactant for reactions with isocyanates in the formation of binder resins (see WO 2009/065018 A1). Humic substances include humic acid, fulvic acid, hymatomelanic acid, ulmic acid, and humin. As stated in WO 2009/065018 A1, humic substances contain hydroxyl groups that react with an isocyanate to form polyurethane resins. Humic acid has previously been included in foundry sand compositions. See U.S. Pat. Nos. 3,023,113 and 3,832,191. Humic acid can be derived from several sources, including lignite, leonardite, peat, and manure. Lignite and leonardite are preferred sources because they are rich in humic acid and readily mined. Lignite is an organic mineraloid that is the lowest rank of coal. Known as "brown coal," lignite has a high inherent moisture content of up to 66 wt. % and a high ash content compared to other forms of coal. Lignite has previously been used as an additive in foundry sand compositions comprising an additional binding agent such as bentonite clay. See U.S. Pat. Nos. 3,445,251 and 4,359,339. When lignite becomes highly oxidized, leonardite is formed. Oxidation increases the humic acid and carbonyl group content. Leonardite particles are generally anionically charged and composed primarily of the mixed salts of humic acid, ulmic acid, and fulvic acid. The humic acid in leonardite is soluble in alkaline solutions and can be extracted from a solid phase source using a strong base, such as sodium hydroxide or potassium hydroxide.

A humic substance containing composition, for use as a polyol component in urethane resin for use as a foundry sand binder is described in WO 2009/065018 A1. This prior art composition was found to have a short shelf life, with the composition showing gross separation (settling) of humic solids, and/or turning into a stiff (i.e. no fluidity) gel within a short duration of storage. The separation of the humic solid prevents the ready standardization of the addition of the humic solids to foundry aggregate over the course of normal foundry mold and core production. These variations in the composition of the foundry mix can affect casting performance of the foundry shape thereby impacting the cost and quality of the resultant casting in a negative manner. To provide a consistent and repeatable amount of humic solids to the foundry mix, the humic solids are herein provided in a stable liquid form. The multi-component kits described herein include a lignite-polyol suspension that contains a lignite, a polyol, and a stabilization agent that preferably includes a dispersing agent, and a thickening agent. Unlike reported examples, lignite-polyol suspensions described herein are stable against separation of suspended solids. Moreover, the herein described lignite-polyol component exhibits relatively high low-shear-rate viscosities and highly shear-thinning rheology. Furthermore, the addition of the dispersing agents and thickening agents would be expected to impair the performance of the foundry mix; however, the resin compositions surprisingly have been found to have improved binder performance compared to the binders of the prior art.

SUMMARY

Described herein, in the preferred embodiment, is a lignite-containing polyurethane resin binder that may be used, among other applications, as a binder of foundry aggregate, e.g., sand, for producing molds and cores for metal castings. The herein described kit can be used to make foundry molds and cores using the separate components of (a) a lignite, a polymerizable polyol, and a stabilization agent; (b) a polymerizable isocyanate; and (c) a catalyst. The components (a), (b), and (c) are, preferably, separately stored. In another preferred embodiment, the components are admixed with a foundry aggregate to form a foundry mix which can be pressed or molded into a foundry shape.

DETAILED DESCRIPTION

Figure 1:
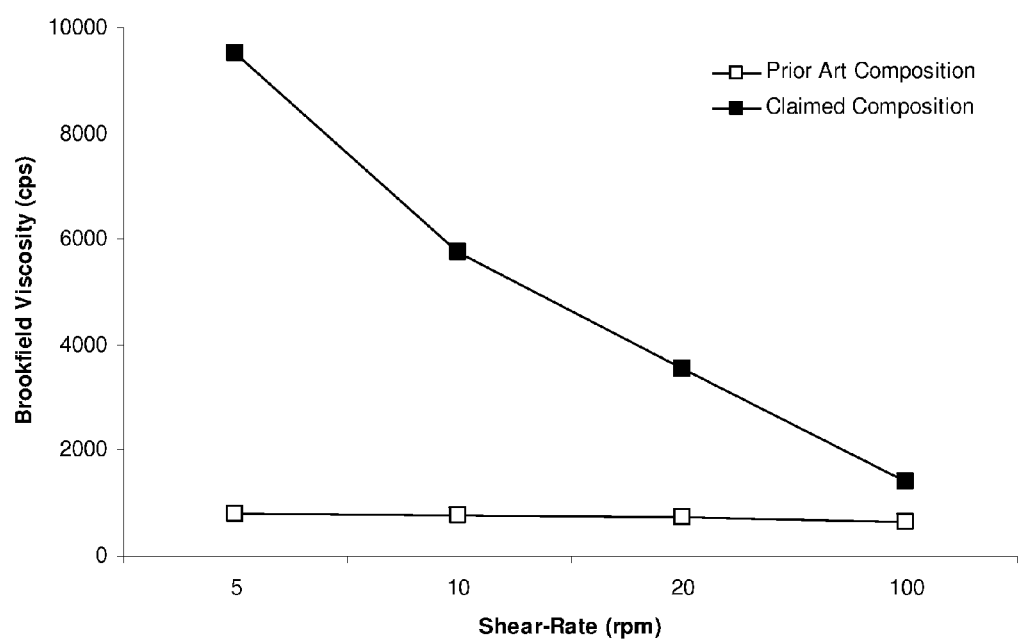
FIG. 1 is a graph comparing the Brookfield viscosities of the lignite-polyol suspension compositions described herein versus prior art lignite suspension compositions at different shear rates (compositions were mixed using a high-shear rate of 6,000 rpm).

Foundry shapes can be formed from foundry mix, e.g., from stable lignite-polyol suspensions by the in situ reaction of a polyol with a polymerizable isocyanate, admixed with a foundry aggregate. In a preferred embodiment, a stable solid-polyol suspension, a polymerizable isocyanate, and a polyurethane polymerization catalyst are provided as a multi-component kit for admixing with a foundry aggregate, to form a foundry mix. The formation of the foundry mix typically involves the stepwise addition of the kit components to the foundry aggregate, e.g. sand, with mixing, to form a foundry mix that sets over the course of a predetermined time, typically minutes. The admixing of the kit components can be either stepwise in the foundry aggregate or some of the kit components, e.g., the polyol component and/or the catalyst component, can be admixed prior to admixing with the foundry aggregate. The kit components form a solid-polyurethane resin that binds the foundry aggregate and permits the formation of a foundry shape useful in metal casting. Another aspect of the multi-component kit described herein is to provide foundry mixes utilizing the resin components.

The multi-component kits perform exceptionally well as binders in sand castings. Finished metal castings were produced from molds formed to a desired shape with the multi-component kits admixed with the foundry aggregate, as described in further detail below. Compared to conventional phenol-formaldehyde and phenol-isocyanate resin binders, the herein described foundry shapes made from the herein described multi-component kits, possess three significant benefits: 1) superior sand shakeout and better core burn out; 2) non-noxious smoke during pouring, cooling, and shakeout; and 3) very low odor at mixing. Moreover, the herein described foundry shapes exhibit limited thermal shock and subsequently have a very high hot strength making them superior molds for metal casting. The quality of shakeout is an important consideration because aggregate and binder residue on the finished casting can impair the quality and/or performance of the finished casting.

The multi-component kits described herein comprise an organic solid having an insoluble component that is completely combustible. In this instance, insoluble means that one of ordinary skill using solvents typical of the art cannot fully solvate the organic solid and completely combustible means that the high temperature pyrolysis of the organic solid leaves little to no inorganic residue. Preferably, the organic solid is humic organic matter, wherein humic organic matter is a catchall term for biopolymers occurring in soil, sediment, and water. Typically, the humic organic matter is a humic substance, e.g. a humic acid-containing or humic acid salt-containing ore. More preferably, the humic organic matter is a lignite, even more preferably leonardite, previously described in this Assignee's U.S. Pat. Nos. 5,695,554 and 5,688,313, and hereby incorporated by reference.

Another important aspect of the multi-component kit is the stability of the kit over time. The separation of the lignite solids (particles) from the lignite-polyol suspension after preparation would be detrimental to the transport, storage, and utility of the suspension. Herein, the described lignite-polyol suspensions are stable over a sufficient time to allow remote manufacturing of the suspension, and subsequent transport, storage, and use without reagitation of the suspension.

The lignite-polyol suspension is an admixture of a lignite, a polymerizable polyol, and a stabilization agent. Preferably the lignite-polyol suspension has good stability against separation; low-shear-rate viscosity of at least 5,000 cps (as measured using a Brookfield viscometer at a spindle speed of 0.5 rpm) and shear-thinning rheology, e.g., where the viscosity of the suspension decreases by at least 50% when the spindle speed/shear rate is increased from about 5 rpm to about 100 rpm; and good performance in urethane polymerization, leading to good binder properties. As used herein, the lignite-polyol admixture is termed a suspension, this is used in a broad sense; the suspension can be a homogeneous mixture, a heterogeneous mixture, an emulsion, and the like.

Preferably, the lignite-polyol suspension exhibits shear-thinning rheology. As used herein, shear thinning means the viscosity of the lignite-polyol suspension decreases when the suspension is subjected to increasing shear force. The effect of shear thinning can be observed by measuring the viscosity of the suspension at various shear rates. The specific viscosity of individual lignite-polyol suspensions are dependant on numerous factors, including the concentration of the components in the suspension, the average lignite particle size, and the chemical structure of the polyol. Preferably, the viscosity of the lignite-polyol suspension decreases by at least 50% when the shear rate is increased from about 5 rpm to about 100 rpm, as measured with a Brookfield Viscometer.

The lignite component is a humic substance, e.g. a humic acid-containing or humic acid/salt-containing ore. The humic substance is preferably a lignite, preferably leonardite, as previously described in this Assignee's U.S. Pat. Nos. 5,695, 554 and 5,688,313, and hereby incorporated by reference. Preferably, the humic substance is a solid lignite component, that contains no more than about 35% water, more preferably about 0 wt. % to about 20 wt. % water, even more preferably about 0 wt. % to about 10 wt. %, based on the dry weight of the lignite. More preferably, the lignite component is leonardite and incorporated into the foundry mix at a concentration from about 1 to about 70 wt. % of the resin in the final foundry mix, more preferably from about 5 to about 50 wt. %, and even more preferably from about 10 to about 30 wt. %. The concentrations are based on the total dry weight of lignite and the total weight of added active polymerizable polyol and isocyanate. The mean particle size of the leonardite is preferably from about 50 nm to about 500 μm, more preferably from about 500 nm to about 400 μm, even more preferably from about 5 μm to about 300 μm, and still more preferably from about 50 μm to about 200 μm.

Suitable polymerizable polyols include, but are not limited to, glycols and glycerols. Glycols include those linear glycols that have a molecular formula of $HO-(CH_2CH_2O)_x-H$, where x is a value between 1 and about 25; and the branched polyols that have a molecular formula of $HO-(CH_2CH_2(R)O)_x-H$, where x is a value between 1 and about 25, and R is a linear, branched, cyclic, alkyl, and/or aromatic group that optionally includes one or more pnictide, chacogenide, and/or halide-containing functionalities. One preferred class of the branched polyols are the glycerols, wherein R contains an alcohol functionality. Suitable polyols additionally include mixed glycols and mixed glycerols. An illustrative example of a mixed glycol is a hydroxy-ethyleneglycol-p-xylene $(HOCH_2C_6H_4CH_2OCH_2CH_2OH)$. Preferably, the polymerizable polyol is a linear glycol having a molecular formula wherein x is a value between 1 and about 10, more preferably wherein x is between 1 and about 5, and even more preferably 3, wherein the glycol is triethylene glycol.

The stabilization agent should prevent or retard the separation of the organic solids from the polyol. Preferably, the stabilization agent is an urethane compatible polymer. More preferably, the stabilization agent is a thickening agent, even more preferably the stabilization agent has two components, a dispersing agent and a thickening agent.

Suitable dispersing agents include homopolymers and copolymers selected from the group consisting of polyethylene glycol/poly(oxyethylene) (PEG), polypropylene glycol, poly(acrylic acid) (PAA), poly(methacrylic acid) (PMA), poly(vinyl alcohol) (PVA), poly(acrylamide), poly(ethylene imine), poly(diallyldimethyl ammonium halide), and poly (vinyl methyl ether). Preferably, the dispersing agent is a monoesterified, homo- or co-polymer of polyethylene glycol (PEG). Preferably, the weight average molecular weight of the PEG-based dispersing agent is in the range of about 1,000 to about 60,000 Dalton, more preferably about 2,000 to about 30,000 Dalton, and most preferably about 4,000 to about 10,000 Dalton.

Commercial PEG polymers are generally labeled as either PEG-n or PEG M, where (n) refers to the average number of ether oxygen groups or the ethylene oxide (EO) repeat units, and the letter (M) refers to an average molecular weight of the polymer. For example, a PEG with n=150 would have an average molecular weight of about 6,000 Dalton and would be labeled as either PEG-150 or PEG 6000. For consistency herein, the PEG polymers are referred to by the average number of EO repeat units per polymer chain and one of ordinary skill in the art can convert one denotation to another.

Herein, the preferred PEGs are those PEGs in the range of PEG-25 to PEG-1400, more preferably in the range of PEG-45 to PEG-700, even more preferably in the range of PEG-90 to PEG-225, and still more preferably PEG-100, PEG-125, and PEG-150. Herein, the preferred dispersing agents are monoesterified where the ester functionality has a linear, branched, cyclic and/or aromatic group. Preferably, the ester functionality is a linear or branched alkyl group with an alkyl chain length equal to or greater than about 8 ($C_8$). More preferably the alkyl chain length is about $C_8$-$C_{18}$, still more preferably the alkyl chain is stearate. Three non-limiting examples of dispersing agents that correspond to the above recited preferences are PEG-100 monostearate, PEG-125 monostearate, and PEG-150 monostearate.

Copolymer dispersing agents include those polymers made from two or more different monomers. The preferable monomers include propylene oxide, vinyl acetate, vinyl amine, vinyl chloride, acrylamide, acrylonitrile, ethylene, propylene, ethylene oxide, lauryl methacrylate, methyl methacrylate, hydroxystearate, dimethylsiloxane, diallyldimethyl ammonium halide, ethylenimine, acrylic acid, and methacrylic acid. Preferably, one of the monomers is ethylene oxide. More preferably, the mole-fraction of the comonomer to ethylene oxide in the dispersing agent is preferably ≤0.4, more preferably ≤0.3, and even more preferably ≤0.2.

Yet another class of polymer applicable as a dispersing agent includes polyvinylpyrrolidone (PVP) polymers and copolymers. Notably, PVP dispersing agents have, preferably, a higher weight average molecular weight than the PEG dispersing agents. Preferably, the weight average molecular weight of the PVP dispersing agent is in the range of about 1,000 to about 1,000,000 Dalton, more preferably about 4,000 to about 500,000 Dalton, and most preferably about 10,000 to about 100,000 Dalton. For example, one preferred PVP homopolymer dispersing agent has a weight average molecular weight of 60,000 Dalton, e.g., (PVP K-30; CAS No. 9003-39-8). Similar to the above disclosed PEG dispersing agents, PVP dispersing agents can be copolymers, including block and graft copolymers, of pyrrolidone and vinyl acetate, vinyl amine, lauryl methacrylate, methyl methacrylate, acrylic acid, methacrylic acid, hydroxystearate, dimethylsiloxane, diallyldimethyl ammonium halide, and/or ethylenimine.

Preferably, the dispersing agent is incorporated into the lignite-polyol suspension in a concentration of about 0.1 to about 30 wt. %, more preferably about 0.25 to about 20 wt. %, even more preferably about 0.5 to about 15 wt. %, based on the weight of the lignite in the suspension.

Suitable thickening agents include homopolymers and copolymers selected from the group consisting of polyethylene glycol/poly(oxyethylene) (PEG), poly(acrylic acid) (PAA), poly(methacrylic acid) (PMA), poly(vinyl alcohol) (PVA), poly(acrylamide), poly(ethylene imine), poly(diallyldimethyl ammonium halide), and poly(vinyl methyl ether); gelatins, and polysaccharides. Preferably, the weight average molecular weight of a PEG-based thickening agent is in the range of about 1,000 to about 60,000 Dalton, more preferably about 2,000 to about 30,000 Dalton, and most preferably about 4,000 to about 10,000 Dalton. The weight average molecular weight of non-PEG-based thickening agents can be up to about 5,000,000 Dalton. Preferably, the thickening agent is a non-esterified or a diesterified, homo- or co-polymer of polyethylene glycol (PEG). Herein, the preferably PEGs are those PEGs in the range of PEG-25 to PEG-1400, more preferably in the range of PEG-45 to PEG-700, even more preferably in the range of PEG-90 to PEG-225, and still more preferably PEG-100, PEG-125, and PEG-150. Herein, the preferred thickening agents are non-esterified or diesterified ester, where the ester functionality has a linear, branched, cyclic and/or aromatic group. Preferably, the ester functionality is a linear or branched alkyl group with a alkyl chain length equal to or greater than about 8 ($C_8$). More preferably the alkyl chain length is about $C_8$-$C_{18}$, still more preferably the alkyl chain is stearate. Six non-limiting examples of thickening agents that correspond to the above recited preferences are PEG-100, PEG-125, PEG-150, PEG-100 distearate, PEG-125 distearate, and PEG-150 distearate. Other preferably thickening-agents include glyceryl esters, having a weight average molecular weight in the range of about 1,000 to about 15,000 Dalton, more preferably about 2,000 to about 10,000 Dalton, and most preferably about 4,000 to about 7,000 Dalton.

Preferably, the thickening agent is incorporated into the lignite-polyol suspension in a concentration of about 0.05 to about 10 wt. %, more preferably about 0.1 to about 7.5 wt. %, even more preferably about 0.2 to about 5 wt. %, based on the weight of the suspension.

The isocyanate component is preferably a polyisocyanate, for example a diisocyanate, a triisocyanate, and so on. The isocyanate component can be either a small molecule isocyanate, a polymeric isocyanate, or a blend of a plurality of isocyanates. Suitable isocyanates include p-phenylene diisocyanate (CAS No. 104-49-4), toluene diisocyanate (CAS No. 1321-38-6), 4,4'-methylenebis(phenylisocyanate) (CAS No. 101-68-8), polymethylene polyphenyl isocyanate (CAS No. 9016-87-9), 1,5-naphthalene diisocyanate (CAS No. 3173-72-6), bitolylene diisocyanate (CAS No. 91-97-4), m-xylene diisocyanate (CAS No. 3634-83-1), m-tetramethylxylene diisocyanate (CAS No. 58067-42-8), hexamethylene diisocyanate, (CAS No. 4098-71-9), 1,6-diisocyanato-2,2,4,4-tetramethylhexane (CAS No. 83748-30-5), 1,6-diisocyanato-2,4,4-trimethylhexane (CAS No. 15646-96-5), trans-cyclohexane-1,4-diisocyanate (CAS No. 2556-36-7), 1,3-bis (isocyanatomethyl)cyclohexane (CAS No. 38661-72-2), 3-isocyanato-methyl-3,5,5-trimethylcyclohexyl isocyanate (CAS No. 4098-71-9), dicyclohexylmethane diisocyanate (CAS No. 5124-30-1) and the polymeric 4,4'-methylene bis (phenylisocyanates) available under the MONDUR product line from BAYER MATERIALSCIENCE. Preferably, the isocyanate component is the "Mondur MR" product available from BAYER MATERIALSCIENCE.

Catalyst components for making rigid polyurethane materials include tin and tertiary amine catalysts. Preferably, the catalyst component favors the gelation reaction (urethane formation) over the blowing reaction (urea formation), as understood in the art. A non-limiting list of applicable catalysts include 1,4-diazabicyclo[2.2.2]octane (DABCO), 1,5-diazabicyclo[4.3.0]non-5-ene (DBN), 1,8-diazabicyclo [5.4.0]undec-7-ene (DBU), pentamethyldipropylenetriamine, bis(dimethylamino ethyl) ether, pentamethyldiethylenetriamine, dimethylcyclohexylamine, tris (3-dimethylamino) propylamine, 4-phenol propyl pyridine, and other liquid tertiary amines. Preferably, the catalyst component is tris (3-dimethylamino) propylamine and/or 4-phenol propyl pyridine.

A preferred process for preparing the lignite-polyol suspension described herein comprises: 1) heating a mixture of a polyol and a dispersing agent to 70° C. in a suitable vessel; 2) mixing the polyol with lignite in a high-shear mixer at 70° C.; 3) adding a molten thickening agent; and 4) cooling the batch under agitation to ambient temperature. The lignite-polyol suspension components are preferably included in the following weight percents to the total weight of the suspension: (A) about 0.1 to about 85 wt. % lignite, preferably about 1 to about 70 wt. %, more preferably about 5 to about 55 wt. %, even more preferably about 10 to about 40 wt. %; (B) about 15 to about 90 wt. % polyol, preferably about 20 to about 80 wt. % polyol, more preferably about 25 to about 70 wt. % polyol, even more preferably about 30 to about 60 wt. % polyol; (C) about 0.01 to about 30 wt. % dispersing agent, preferably about 0.5 to about 25 wt. %, more preferably about 1 to about 20 wt. %, even more preferably about 1 to about 15 wt. %; and (D) about 0.05 to about 15 wt. % thickening agent, preferably about 0.1 to about 12 wt. %, more preferably about 0.5 to about 10 wt. %, and even more preferably about 1 to about 7 wt. %. Alternatively and when the stabilization agent is only a thickening agent, the thickening agent is included in about 0.1 to about 35 wt. %, preferably about 1 to about 30 wt. %, and more preferably in about 2 to about 25 wt. %.

In a preferred embodiment, the dispersing agent is PEG-100 stearate at a concentration of about 0.1 to 25 wt. % based on the total weight of the lignite, dry basis, more preferably about 0.5 to about 5 wt. %. The polyol, preferably triethylene glycol, is incorporated at a concentration of about 15 to about 90 wt. %, based on the total final weight of the lignite-polyol suspension, more preferably of about 40 to about 70 wt. %. The thickening agent is preferably a waxy compound, e.g. PEG-150 distearate or PEG-150, at a concentration of about 1 to about 10 wt. %, based on the total weight of the polyol, more preferably about 2 to about 10 wt. %, even more preferably the weight percent of the thickening agent is greater than about 3 wt. %, still more preferably greater than about 3.75 wt. %, and even still more preferably greater than about 4.25 wt. %. In another preferred embodiment, the lignite-polyol suspension further comprises an alkali, which, theoretically, may increase the solubility of the humic acid in the polyol. Sodium hydroxide or a comparable alkaline solution is added to the dispersion medium (lignite carrier) at a concentration of active base from about 0.5 to 30 wt. % of the lignite, more preferably from about 5 to about 15 wt. %. In yet another preferred embodiment, the polyol is admixed with a polar organic solvent prior to heating and mixing with the dispersing agent. Preferably, the molar ratio of the solvent to the glycol is about 0.05 to about 9, more preferably about 0.1 to about 3, even more preferably about 0.5 to about 1.5. Preferably, the polar organic solvent does not affect the polyurethane polymerization. Examples of polar organic solvents that do not affect the polyurethane polymerization reaction are well know to those of ordinary skill in the art, some examples of polar organic solvent classes include secondary and tertiary alcohols, ketones, amides, amines, nitriles, acetates, ethers, and aldehydes. In one, non-limiting, example with triethylene glycol, the polar organic solvent is propylene carbonate and the molar ratio was 1.

The type of aggregate and amount of binder used to prepare foundry mixes can vary widely and is known to those skilled in the art. One preferred aggregate is silica sand. Other suitable aggregate materials include olivine, zircon, chromite, carbon, fluid coke, related materials, and aggregate mixtures.

The multi-component kits are preferably used as binders in combination with foundry aggregate at concentrations at about 0.1 to about 10 wt. %, more preferably at about 1 to about 2.5 wt. %, based on the dry weight of the aggregate.

In one embodiment for preparing a foundry shape, the components of the multi-component kits are individually admixed with the foundry aggregate. The resultant foundry mix is then mixed until nearly homogeneous, and then formed into a foundry shape. In another embodiment the lignite-polyol suspension and the isocyanate components are pre-mixed, then admixed with the foundry aggregate. In yet another embodiment, the lignite-polyol suspension is pre-mixed with the catalyst component, then admixed with the foundry aggregate. In still another embodiment, the isocyanate is premixed with the catalyst component and then admixed with the foundry aggregate.

The foundry mix is then formed into a foundry shape. Generally in the art, the mold and the core are made from different foundry mixes. The mold mix commonly comprising a clay binder and the core mix commonly comprising a polymer binder. After casting, the majority of the spent foundry shape is removed from the cast shape by shake-out. During shake-out the majority of the mold breaks free from the casting and some of the core is removed. Often the core-binders are not destroyed during casting and must be physically broken from the internal areas of the core. Following the shake-out process and core-removal, the casting is cleaned, wherein residual aggregate is removed by primarily shot blasting. Here, metal flashing and aggregate is removed from the surface of the casting and metal is often adhered to the aggregate. This multi-step process for isolating a cast shape is time consuming, costly, as well as energy and material intensive. The herein described materials and methods significantly reduce the time and energy necessary for the isolation of a cast shape by improving the shake-out, the core removal process, and the number of foundry mixes necessary to make a shape. Preferably, the mold and the core are manufactured with the herein described foundry mix and after casting are cleanly broken from the cast shake during shake-out.

In a preferred embodiment the core is manufactured from the herein described foundry mix. Preferably, the binders in the core shape are fully destroyed by the heat of the liquid metal and following the solidification of the metal flow freely from the core area during shakeout. More preferably, about 30 to about 60% more aggregate is removed during shake-out when the herein described foundry mix is used to form the foundry shape. Even more preferably and possibly due to improved burn-out of the binder, the reclamation costs for the aggregate are decreased by about 20 to about 50%.

The metal casting (an article of manufacture) is preferably formed by pouring liquid metal into the foundry shape. The metal making up the casting and/or the liquid can be any metal capable of being cast in an aggregate shape. Examples of metals include iron, steels, carbon steals, stainless steels, chromium steels, alloys, aluminum, titanium, zinc, copper, silver, gold, platinum, palladium, nickel, cobalt, manganese, and mixtures thereof. Preferably, the liquid metal is poured at a sufficiently high temperature to facilitate the burnout of the core resin.

The compositions and processes described herein have been primarily described and illustrated in terms of their use in the foundry art, but those skilled in the art will recognize that the binder resins and binder resin-containing compositions described herein may also be utilized in other fields, including adhesives, coatings, and composites.

EXAMPLES

The following examples further illustrate the preparation of several foundry binder compositions within the scope of the present invention. Those skilled in the art will recognize that similar compositions may be prepared containing quantities and species of materials different from those represented in the examples. The lignite particle size was such that 100% by weight of the lignite particles passed through a 200-mesh screen, except where noted.

Example 1

A high-shear, rotor-stator homogenizer (Silverson Homogenizer) was charged with a 70° C. mixture of 194.63 g of triethylene glycol (TEG) and 1.8 g of polyethylene glycol-100 stearate (PEG-100 stearate). While mixing the solution at 70° C., 95.46 g of lignite powder, having a moisture-content of 5.72 wt. %, was added over the course of about 5 min. The resulting suspension was continuously mixed for about 20 minutes at 6,000 rpm then 8.11 g of polyethylene glycol-150 (PEG-150), pre-heated to 70° C., was added to the suspension, and then the suspension was mixed for an additional 10 minutes at 6,000 rpm. The batch was then cooled to ambient temperature, while under agitation in a Caframo-type mixer fitted with a paddle agitator operating at 1,500 rpm.

Comparative Example 1

A comparative composition was made using the procedure for Example 1 excluding the PEG-100 stearate and PEG-150.

Example 2

A mixture of 194.11 g of TEG and 1.8 g of PEG-100 stearate was heated to 70° C. then mixed, using a high-shear, rotor-stator homogenizer (Silverson Homogenizer). Then 96 g of lignite powder, having a moisture-content of 6.25 wt. %, was added over the course of about 5 min while mixing at 70° C. The resulting sample was continuously mixed for about 20 minutes at 10,000 rpm, then 8.09 g of PEG-150, pre-heated to 70° C., was added to the sample. The sample was then mixed for an additional 10 minutes at 10,000 rpm. The batch was then cooled to ambient temperature, while under agitation in a Caframo-type mixer fitted with a paddle agitator operating at 1,500 rpm.

Comparative Example 2

A comparative composition was made using the procedure for Example 2 excluding the PEG-100 stearate and PEG-150.

Example 3

In Example 3, the lignite particle size was such that 65% by weight of the lignite particles passing through a 200-mesh screen. A mixture of 195.51 g of TEG and 1.8 g of PEG-100 stearate was heated to 70° C. then mixed, using a high-shear, rotor-stator homogenizer (Silverson Homogenizer). Then 94.54 g of lignite powder, having a moisture-content of 4.8 wt. %, was added over the course of about 5 min while mixing at 70° C. The resulting sample was continuously mixed for about 20 minutes at 10,000 rpm, then 8.15 g of PEG-150, pre-heated to 70° C., was added to the sample. The sample was then mixed for an additional 10 minutes at 10,000 rpm. The batch was then cooled to ambient temperature, while under agitation in a Caframo-type mixer fitted with a paddle agitator operating at 1,500 rpm.

Example 4

A mixture of 190.66 g of TEG, 1.8 g of PEG-100 stearate, and 3.6 g of a 50% (w/w) sodium hydroxide solution was heated to 70° C. then mixed, using a high-shear, rotor-stator homogenizer (Silverson Homogenizer). Then 96 g of lignite powder, having a moisture-content of 6.25 wt. %, was added over the course of about 5 min while mixing at 70° C. The resulting sample was continuously mixed for about 20 minutes at 6,000 rpm, then 7.95 g of polyethylene glycol 6,000 (PEG-150), pre-heated to 70° C., was added to the sample. The sample was then mixed for an additional 10 minutes at 6,000 rpm. The batch was then cooled to ambient temperature, while under agitation in a Caframo-type mixer fitted with a paddle agitator operating at 1,500 rpm.

Comparative Example 4

A comparative composition was made using the procedure for Example 4 excluding the PEG-100 stearate and PEG-150.

Example 5

A mixture of 192.64 g of TEG, 1.8 g of PEG-100 stearate, and 3.6 g of a 50% (w/w) sodium hydroxide solution was heated to 70° C. then mixed, using a high-shear, rotor-stator homogenizer (Silverson Homogenizer). Then 96 g of lignite powder, having a moisture-content of 6.25 wt. %, was added over the course of about 5 min while mixing at 70° C. The resulting sample was continuously mixed for about 20 minutes at 10,000 rpm, then 5.96 g of PEG-150, pre-heated to 70° C., was added to the sample. The sample was mixed for an additional 10 minutes at 10,000 rpm. The batch was then cooled to ambient temperature, while under agitation in a Caframo-type mixer fitted with a paddle agitator operating at 1,500 rpm.

Example 6

A mixture of 131.83 g of TEG, 87.88 g of propylene carbonate (PC), and 17.95 g of melted PEG-150 stearate was sheared under strong agitation using a caframo-type mixer with a dispersion-blade agitator at 650 rpm. Then 187.44 g of lignite (4.8 wt. % water) was added to the sheared mixture to form a suspension. The suspension was mixed for about 10 minutes at 650 rpm then transferred to a homogenizer and mixed for 30 minutes at 6,000 rpm. The resulting suspension was cooled to about 20° C. Then 417.5 g of the suspension was mixed with 39.66 g of a thickening agent mixture. The thickening agent mixture was made by heating 232.5 g of TEG and 232.5 g of PC to about 55° C., adding 135 g PEG-150 distearate under strong agitation, and then cooling under agitation to about 20° C.

Example 7

A mixture of 0.98 g of polyvinylpyrrolidone (PVP; PVP K-30 available from INTERNATIONAL SPECIALTY PRODUCTS) and 108.56 g of TEG was mixed under strong agitation at 650 rpm. Then 97.5 g of lignite (5.2 wt. % water) was slowly added to the mixture and the mixing speed was then increased to 1,500 rpm for 10 minutes to form a suspension. The suspension was then homogenized at 6,000 rpm for 15 minutes at about 60° C. The resulting suspension was cooled to about 20° C. Then 183.39 g of the suspension was mixed with 20.06 g of a thickening agent mixture. The thickening agent mixture was made by heating 290.63 g of TEG and 96.88 g of PC to about 55° C., adding 112.5 g of PEG-150 distearate under strong agitation, and then cooling under agitation to about 22° C.

Example 8

A mixture of 1.5 g of PVP K-30, 150.8 g of TEG, and 37.7 g of propylene carbonate was mixed under strong agitation at 650 rpm. Then 150 g of lignite (4.8 wt. % water) was slowly added to the mixture and the sample was mixed at 650 rpm for 10 minutes. The sample was then homogenized at 6,000 rpm for 30 minutes and cooled to about 20° C. Then 333.5 g of the sample was mixed with 38.1 g of a thickening agent mixture. The thickening agent mixture was made by heating 310 g of TEG and 77.5 g of PC to about 55° C., adding 112.5 g of PEG 6000 under strong agitation, and then cooling under agitation to about 22° C.

Viscosity

The viscosity of the lignite-polyol suspensions, the samples, were tested by first, individually and uniformly mixing lignite-polyol samples. Each sample was put into a 400 ml beaker, and mixed at approximately 1,000-1,500 RPMs under a Coframo overhead mixer with a 1⅝" diameter 'D' design high dispersion mixing blade for one minute (60 seconds). The sample was then rapidly, within 2 minutes, transferred to a Brookfield DV-I+viscometer, and from a Brookfield RV spindle set the appropriate spindle was immersed in the sample. The spindle was allowed to sit for 30 seconds while in the sample and then the viscometer was turned on and viscosity readings were record after one minute at each of the following RPMs: 0.5; 1; 2; 2.5; 5; 10; 20; 50; and 100.

The Brookfield viscosities of suspensions produced by the methods recited in Example 1 and Comparative Example 1 (the suspensions are referred to hereinafter by their example preparation numbers) were measured and the results are shown in FIG. 1. Example 1 showed a relatively high value for the low-shear-viscosity at 5 rpm and highly shear-thinning rheology even though the suspension contained a considerable amount of PEG-150, a waxy material. The viscosity of Example 1 dropped by a factor of about 6.8 upon increasing the spindle-speed/shear-rate from 5 rpm to 100 rpm. Due to the highly shear-thinning rheology, the suspension could be easily pumped using a laboratory peristaltic pump operated at a relatively low speed with no separation of solids. Comparative Example 1 showed a relatively low value for the low-shear-rate viscosity at 5 rpm and a relatively low level of shear-thinning rheology. The viscosity dropped by a factor of about 1.2 upon increasing the spindle speed/shear-rate from 5 rpm to 100 rpm.

Figure 2:
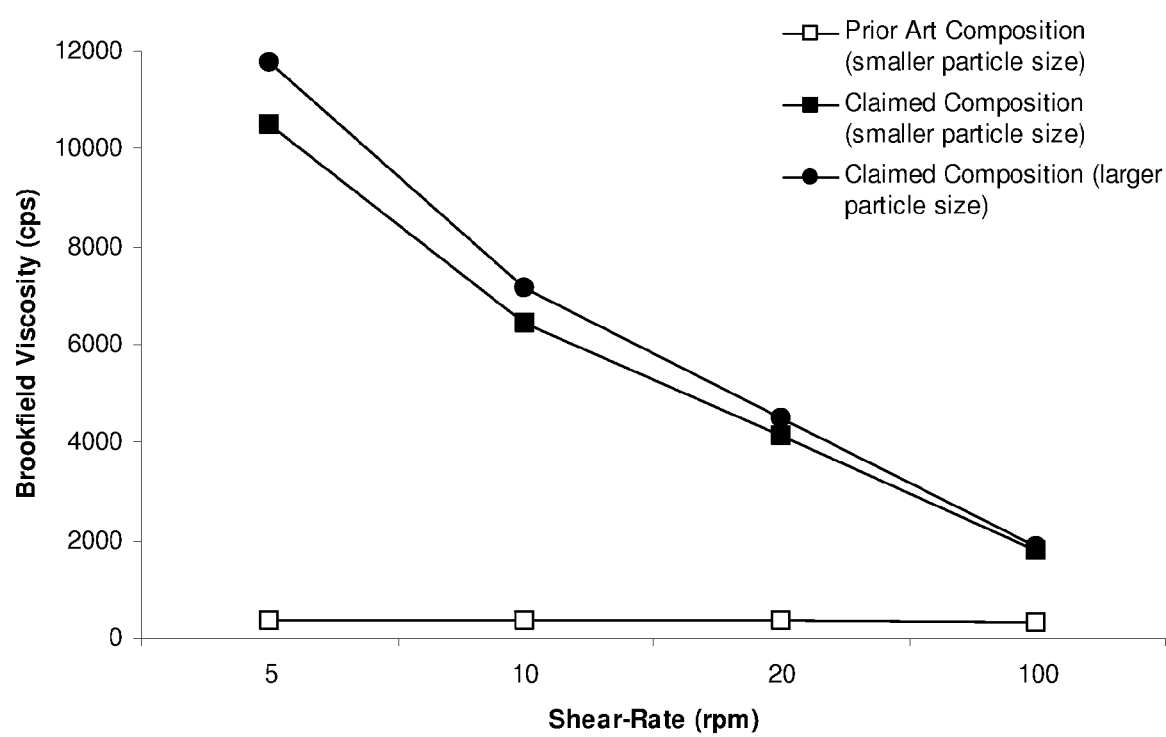
FIG. 2 is a graph comparing the Brookfield viscosities of the lignite-polyol suspension compositions described herein versus prior art compositions at different shear rates (compositions were mixed using a high-shear rate of 10,000 rpm).

The Brookfield viscosities of suspensions produced by the methods recited in the Example 2 and Comparative Example 2 (the suspensions are referred to hereinafter by their example preparation numbers) were measured and are shown in FIG. 2. Example 2 showed a relatively high value for the low-shear-viscosity at 5 rpm and highly shear-thinning rheology. The viscosity dropped by a factor of about 5.9 upon increasing the shear-rate from 5 rpm to 100 rpm. The suspension could be pumped easily and did not show any separation of settled solids in stability testing. Comparative Example 2 showed a relatively low value for the low-shear-rate viscosity at 5 rpm and a relatively low level of shear-thinning rheology. The viscosity dropped by a factor of about 1.1 upon increasing the spindle speed/shear-rate from 5 rpm to 100 rpm.

Without being bound to any particular theory, the viscosity of Example 1, Example 2, suggest that a higher homogenizer speed, i.e. stronger shear forces, leads to a higher Brookfield viscosity while maintaining a considerably high level of shear-thinning rheology. In contrast, the comparative examples showed a significant decrease in Brookfield viscosities when mixed at an increased spindle speed/shear-rate.

The Brookfield viscosities of a suspension produced by the method recited in Example 3 (the suspension is referred to hereinafter by their example preparation number) were higher than the values for examples with smaller sized lignite particles. Example 3 showed a relatively high value for the low-shear-viscosity at 5 rpm and highly shear-thinning rheology. The viscosity dropped by a factor of about 6.4 upon increasing the spindle speed/shear-rate from 5 rpm to 100 rpm. The suspension could be pumped easily and did not show any separation of settled solids in stability testing.

Figure 3:
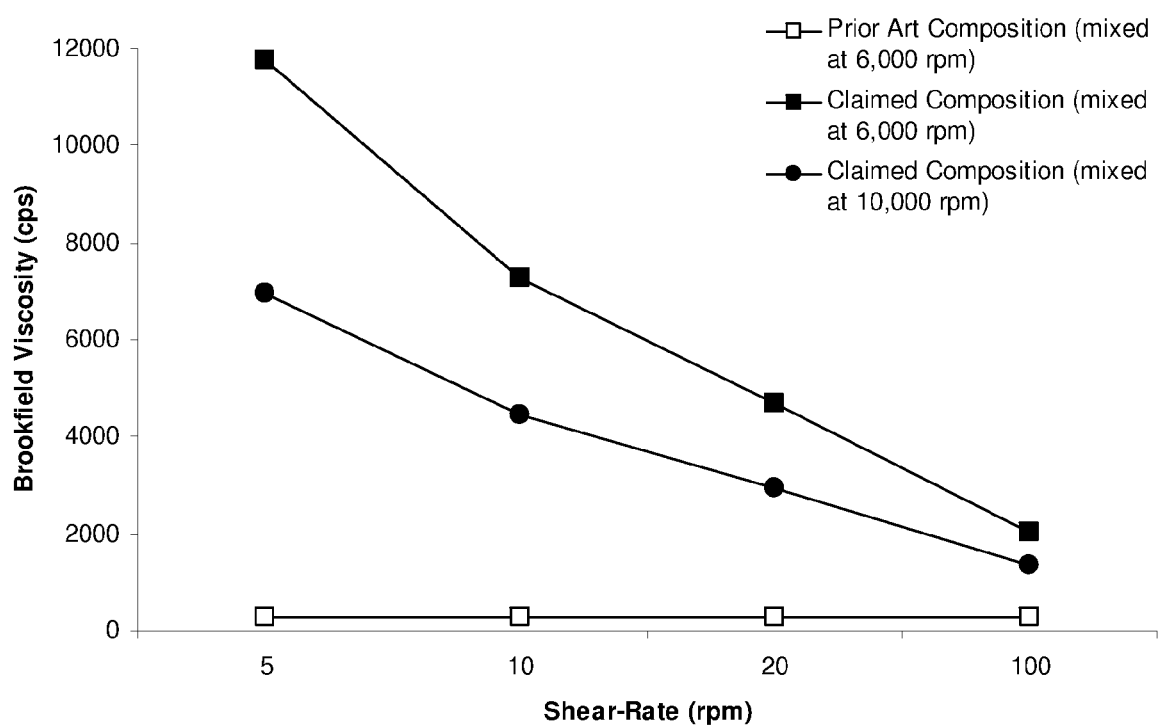
FIG. 3 is a graph comparing the Brookfield viscosities of the lignite-polyol suspension compositions described herein versus prior art compositions with an alkaline solution additive at different shear-rates.

The Brookfield viscosities of suspensions produced by the methods recited in Example 4 and Comparative Example 4 (the suspensions are referred to hereinafter by their example preparation numbers) are shown in FIG. 3. The Brookfield viscosities Example 4 showed a relatively high low-shear-viscosity at 5 rpm, and highly shear-thinning rheology. The viscosity dropped by a factor of about 5.8 upon increasing the shear-rate from 5 rpm to 100 rpm. Example 4 could be pumped easily and did not show any separation of settled solids in stability testing. The Brookfield viscosities of Comparative Example 4 showed a relatively low value for the low-shear-viscosity at 5 rpm and a relatively low level of shear-thinning rheology. The viscosity dropped a negligible amount upon increasing the spindle speed/shear-rate from 5 rpm to 10 rpm.

The Brookfield viscosities of a suspension produced by the method recited in Example 5 (the suspension is referred to hereinafter by their example preparation number) are shown in FIG. 3 and show a relatively high low-shear-viscosity (at 5 rpm) and highly shear-thinning rheology. The viscosity dropped by a factor of about 5.8 upon increasing the spindle speed/shear-rate from 5 rpm to 100 rpm. The suspension could be pumped easily and did not show any separation of settled solids when centrifuged at 1,000 rpm for 30 minutes.

Static Settling

The stability of the lignite-polyol suspension, the sample, was tested by first, uniformly mixing lignite-polyol samples. The samples were put into a 400 ml beaker, and mixed at approximately 1,000-1,500 RPMs under a Coframo overhead mixer with a 1⅝" diameter 'D' design high dispersion mixing blade for one minute (60 seconds). Then 50.0±0.10 g of the lignite-polyol sample was added to a 100 ml beaker and was allowed to sit overnight, undisturbed, for at least 15 hours. A small laboratory spatula was then inserted into the sample and the bottom of the beaker was scraped. If settled material was readily apparent, e.g. the supernatant appears clear and the bottom of the beaker is thickly coated with solid, the solid adheres to the spatula upon removal from the suspension, and/or the spatula encounters increased resistance across the bottom of the beaker, then the sample is determined to have failed this test. Correspondingly, the sample passes the test if there is no observable material and/or no material adhering to the spatula.

Centrifugal Settling

The stability of the lignite-polyol suspension, the sample, was tested by first, uniformly mixing lignite-polyol samples. The samples were put into a 400 ml beaker, and mixed at approximately 1,000-1,500 RPMs under a Coframo overhead mixer with a 1⅝" diameter 'D' design high dispersion mixing blade for one minute (60 seconds). Then 50.0±0.10 g of the lignite-polyol sample was added to a 50 ml polypropylene centrifuge tube and was allowed to sit overnight, undisturbed, in the 50 ml centrifuge tube (approximately 15-20 hours). The sample was then placed in centrifuge and spun at a rate of approximately 1,000 RPMs (or equivalent to approximately 235 g-force) for 30 min at 24° C. The centrifuge tube was then removed from the centrifuge, inverted, and held at a 45° angle until the fluid sample flowed from the tube and >3 seconds occurs between individual drops.

The interior of the centrifuge tube was checked for settled material by lightly feeling for settled material using a thin metal lab spatula (or similar) to determine if there is settled material on the bottom of the centrifuge tube. Generally, the settled material is very dense and appreciably solid at the bottom of the centrifuge tube. One of ordinary skill in the art is capable of assessing the presence of a solid and would understand that opaque suspensions and high viscosities require the physical investigation of a centrifugally separated solid. Here, samples are distinguished on a pass/fail standard, where a sample with any noticeable separated solid fails. Examples tested for centrifugal stability (CS) are presented in Table 1.

The centrifugal stability test can be quantified by isolating and measuring the specific gravity of the polyol suspension (supernatant). First, an average specific gravity is obtained for a sample having been mixed at approximately 1,000-1,500 RPMs under a Coframo overhead mixer with a 1⅝" diameter 'D' design high dispersion mixing blade for one minute (60 seconds). Typically, the average specific gravity of the sample is the mean value of three independent measurements of the sample. Then the sample is subjected to the same general centrifugal settling procedure as described above, next the tube is inverted and the fluid allowed to flow from the tube into a collection flask from which the specific gravity of the sample is obtained. The centrifugal settling is repeated at least two additional times and the average specific gravity of the centrifuged sample is the mean value of the independent measurements. The percent change (% Δ) in the specific gravity of the sample after centrifuging the sample is preferably less than about 5%, more preferably less than about 1%, even more preferably less than about 0.5%, and still more preferably less than about 0.1%. If the centrifuged sample has a high viscosity, the sample may be diluted with water wherein the diluted sample does not exhibit settling during storage over a period of at least 30 minutes. Correspondingly, one of ordinary skill will recognize that the calculation of the percent change in samples diluted with water require similar dilutions of the non-centrifuged samples, with the caveat that

TABLE 1

| | Mass Polyol | Mass Lignite | Mass Propylene Carbonate | Mass Dispersing Agent | Mass Thickening agent | Static Settling Result |
|---|---|---|---|---|---|---|
| Example 1 | 194.6 | 95.5 | | 1.8 | 8.1 | PASS |
| CompEx 1 | 194.6 | 95.5 | | — | — | Fail |
| Example 2 | 194.1 | 96 | | 1.8 | 8.1 | PASS |
| CompEx 2 | 194.1 | 96 | | — | — | Fail |
| Example 3 | 195.5 | 94.5 | | 1.8 | 8.2 | PASS |
| Example 4 | 190.7 | 96 | | 1.8 | 8.0 | PASS |
| CompEx 4 | 190.7 | 96 | | — | — | Fail |
| Example 5 | 192.6 | 96 | | 1.8 | 6.0 | PASS |
| Example 6 | 144.6 | 184.6 | 101.5 | 17.6 | 8.9 | PASS |
| Example 7 | 107.7 | 86.3 | 3.9 | 0.9 | 4.5 | PASS |
| Example 8 | 171.3 | 147 | 5.9 | 1.5 | 8.6 | PASS | the dilution with water is conducted only for measurement of the specific gravity and diluted samples are not subjected to the centrifugal settling procedure.

TABLE 2

|  | Centrifuge Stability Result | % Δ Spec. Grav. |
|---|---|---|
| Example 1 | PASS | 0.0 |
| Comp. Ex. 1 | Fail | 10.2 |
| Example 2 | PASS | 0.1 |
| Comp. Ex. 2 | Fail | 9.8 |
| Example 3 | PASS | 0.1 |
| Example 4 | PASS | 0.2 |
| Comp. Ex. 4 | Fail | 10.3 |
| Example 5 | PASS | — |
| Example 6 | PASS | — |
| Example 7 | PASS | — |
| Example 8 | PASS | — |

Binder Performance

The binder performance of the compositions described in the previous examples were compared. The binder system tested was comprised of the lignite suspensions in the previous examples, an isocyanate, and a catalyst. For the isocyanate component, "Mondur MR," an aromatic polymeric isocyanate based on diphenylmethane-diisocyanate was used, and a liquid tertiary amine based on 4-phenol propyl pyridine was the catalyst. The test method used was similar to what is typically used in the art, comprising the steps of mixing sand with the three parts of the binder system, packing the binder-coated sand into a test sample mold, and measuring the tensile strength of the test specimen after various time intervals. All tests were carried out with 3,000 g of round grain silica sand (Badger 5574). Table 1 shows the sand binder compositions and the binder performance of the above-described PEG-100 stearate- and PEG-150-containing resin binder compositions compared to prior art compositions. The claimed compositions differed from the prior art systems because they contained a dispersing agent (PEG-100 stearate) and a thickening agent (PEG-150). The greater the tensile strength of the samples, the more effective the composition is as a binder. As evident from Table 1, the PEG-100 stearate- and PEG-150-containing resin binder compositions described herein consistently showed superior binder performance, as compared to the prior art lignite resin binder compositions. When combined with silica sand, the resin binder compositions described herein yielded tensile strengths higher than the prior art humic acid resin binder compositions at comparable or reduced cure rates.

What is claimed is:

1. A foundry mix comprising:
    a binder consisting essentially of a lignite-polyurethane resin that is a reaction product of a lignite-polyol suspension that is stable against separation, a polymerizable isocyanate, and a polyurethane polymerization catalyst; and
    a foundry aggregate;
    wherein the lignite-polyol suspension includes a dispersing agent and passes the static settling test.

2. The foundry mix of claim 1 consisting essentially of:
    the lignite-polyurethane resin binder that comprises a reaction product of a lignite-polyol suspension that is stable against separation, the polymerizable isocyanate, and a polyurethane polymerization catalyst; and
    the foundry aggregate.

3. The foundry mix of claim 2, wherein the foundry mix comprises about 0.1 to about 10 parts by weight of the lignite-polyurethane resin and about 100 parts by weight of the foundry aggregate.

4. The foundry mix of claim 2, wherein the polymerization catalyst is selected from group consisting of 1,4-diazabicyclo[2.2.2]octane (DABCO), 1,5-diazabicyclo[4.3.0]non-5-ene (DBN), 1,8-diazabicyclo[5.4.0]undec-7-ene (DBU), pentamethyldipropylenetriamine, bis(dimethylamino ethyl)ether, pentamethyldiethylenetriamine, dimethylcyclohexylamine, tris (3-dimethylamino) propylamine, and a mixture thereof.

5. The foundry mix of claim 1, wherein the lignite-polyurethane resin consists essentially of the reaction product of the lignite-polyol suspension, the polymerizable isocyanate, and the polyurethane polymerization catalyst.

6. The foundry mix of claim 5, wherein the lignite-polyol suspension consists essentially of lignite, a polyol, a dispersing agent, and optionally a solvent.

7. The foundry mix of claim 1, wherein the lignite comprises about 0 to about 10 wt. % water, based on the weight of dry lignite.

8. The foundry mix of claim 1, wherein the lignite is leonardite.

9. The foundry mix of claim 6, wherein the dispersing agent is a polymer selected from the group consisting of (A) a polymer selected from the group consisting of a monoesterified polyethylene glycol (PEG), a poly(acrylic acid) (PAA), a poly(methacrylic acid) (PMA), a poly(vinyl alcohol) (PVA), a poly(acrylamide), a poly(ethylene imine), a poly(diallyldimethyl ammonium halide), a poly(vinyl methyl ether), and a mixture thereof; (B) a polyvinylpyrrolidone (PVP); (C) a polyvinylpyrrolidone copolymer; and (D) a copolymer of a plurality of monomers selected from the group consisting of propylene oxide, vinyl acetate, vinyl

TABLE 3

| Example | Lignite-Polyol Suspension | Mass Suspension (g) | Mass Isocyanate (g) | Mass Catalyst (g) | Work Time (min) | Set Time (min) | Tensile Strength, psi | | | |
|---|---|---|---|---|---|---|---|---|---|---|
|  |  |  |  |  |  |  | 30 min | 1 Hr. | 2 Hr. | 24 Hr. |
| 9 | Comp. Ex. 1 | 12.9 | 17.1 | 1 | 8.5 | 13.5 | 129 | 151 | 155 | 191 |
| 10 | Example 1 | 12.9 | 17.1 | 1 | 7.75 | 12.5 | 143 | 191 | 188 | 192 |
| 11 | Comp. Ex. 1 | 12 | 18 | 1 | 7.5 | 12.75 | 166 | 196 | 195 | 203 |
| 12 | Example 1 | 12 | 18 | 1 | 7.75 | 12.5 | 180 | 260 | 241 | 246 |
| 13 | Comp. Ex. 2 | 12.9 | 17.1 | 1 | 7.5 | 13.25 | 100 | 125 | 119 | 135 |
| 14 | Example 2 | 12.9 | 17.1 | 1 | 7.5 | 13 | 140 | 169 | 149 | 199 |
| 15 | Example 3 | 12.9 | 17.1 | 1 | 6.25 | 11.5 | 167 | 171 | 165 | 187 |
| 16 | Example 1 | 12.9 | 17.1 | 1 | 7.75 | 12.5 | 175 | 206 | 195 | 190 |
| 17 | Comp. Ex. 4 | 12.9 | 17.1 | 1 | 7.5 | 13 | 78 | 84 | 92 | 89 |
| 18 | Example 4 | 12.9 | 17.1 | 1 | 7 | 12 | 195 | 202 | 179 | 152 |
| 19 | Example 5 | 12.9 | 17.1 | 1 | 6.5 | 12.75 | 177 | 179 | 184 | 150 | amine, vinyl chloride, acrylamide, acrylonitrile, ethylene, propylene, ethylene oxide, lauryl methacrylate, methyl methacrylate, hydroxystearate, dimethylsiloxane, diallyldimethyl ammonium halide, ethylenimine, acrylic acid, and methacrylic acid; and (E) a mixture thereof.

10. The foundry mix of claim 9, wherein the polymer is selected from the group consisting of from PEG-100 monostearate, PEG-125 monostearate, PEG-150 monostearate, and a mixture thereof.

* * * * *